H. YOUNG.
WATER HEATING TOP FOR GAS STOVES.
APPLICATION FILED MAR. 23, 1920.
1,379,154.
Patented May 24, 1921.
2 SHEETS—SHEET 1.
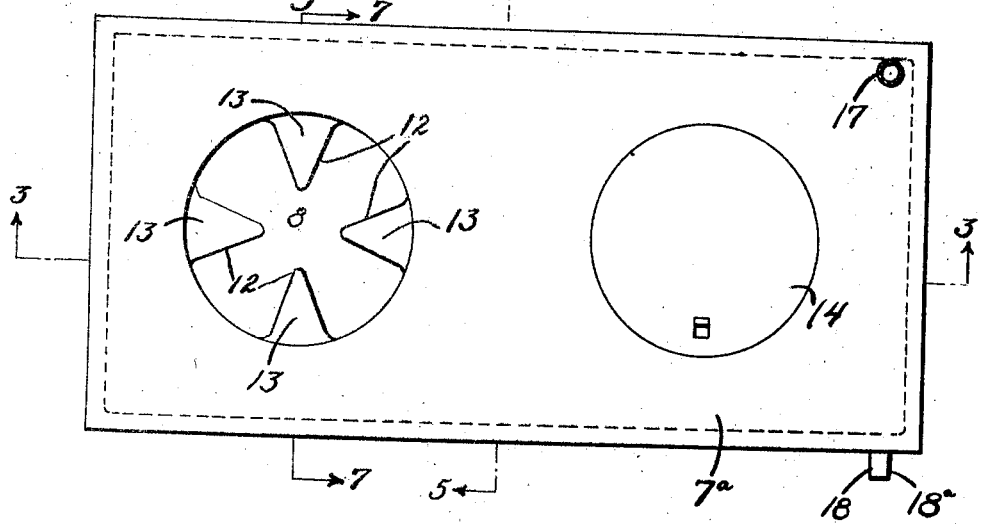
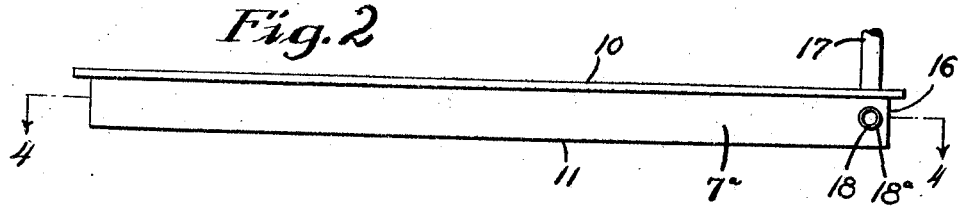
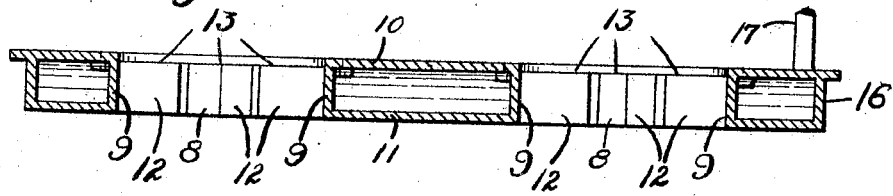
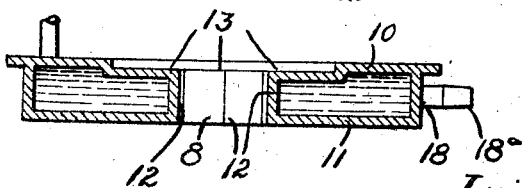
Witnesses
Geo. A. Gruss
Augustus B. Coppes
Inventor
Harry Young
By Joshua R. H. Potts
his Attorney H. YOUNG.
WATER HEATING TOP FOR GAS STOVES.
APPLICATION FILED MAR. 23, 1920.
1,379,154.
Patented May 24, 1921.
2 SHEETS—SHEET 2.
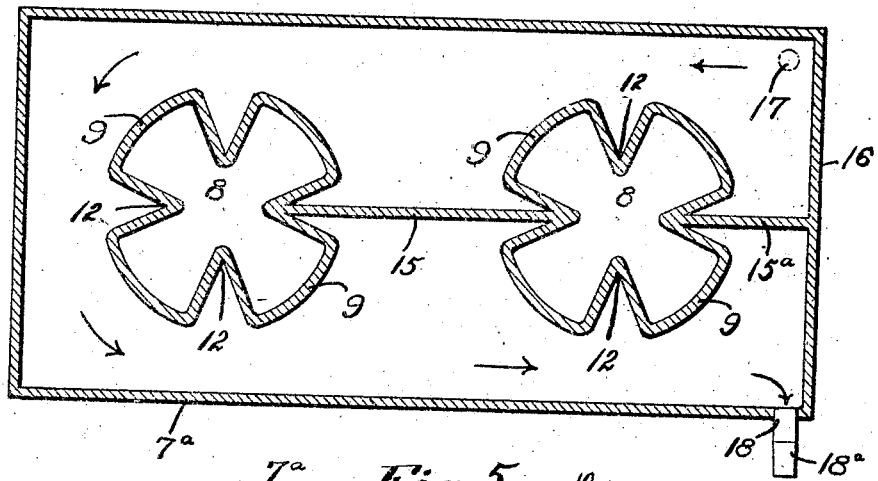
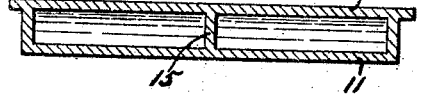
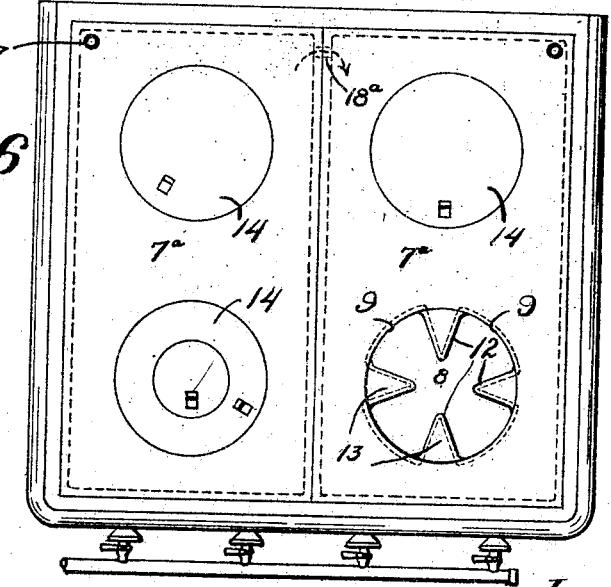
Witnesses
Geo. A. Gruss
Augustus B. Coppes
Inventor
Harry Young
By Joshua R. H. Potts
his Attorney

UNITED STATES PATENT OFFICE.

HARRY YOUNG, OF PHILADELPHIA, PENNSYLVANIA.

WATER-HEATING TOP FOR GAS-STOVES.

1,379,154.  Specification of Letters Patent.  Patented May 24, 1921.

Application filed March 23, 1920. Serial No. 368,060.

*To all whom it may concern:*

Be it known that I, HARRY YOUNG, a citizen of the United States, residing at Philadelphia, in the county of Philadelphia and State of Pennsylvania, have invented certain new and useful Improvements in Water-Heating Tops for Gas-Stoves, of which the following is a specification.

One object of my invention is to provide an improved water heating top for gas stoves and which will be so constructed that it will efficiently absorb heat from gas burners while the flame of the gas burner is being used for cooking purposes; said absorption of heat being such as to efficiently heat a body of water so that the latter can be used for various purposes throughout a household and thus do away with the necessity of having additional and independent water heating means.

Another object is to make the device of my invention of a simple and durable construction so that it can be placed on various types of gas stoves and in which a portion of the heat absorbing means will serve as secure supporting means for cooking utensils and at the same time provision is made for plates so as to close the orifices through which the flame passes, if so desired.

Another object is to so construct the device of my invention that one or more units may be used and if two or more units are used, to provide nipple connections between the units, so that water from one unit can circulate therethrough and then pass into and circulate through an adjacent unit.

These objects, and other advantageous ends which will be described hereinafter, I attain in the following manner, reference being had to the accompanying drawings in which Figure 1 is a top plan view of one of the units of my invention, Fig. 2 is a front elevation of Fig. 1, Fig. 3 is a section taken on the line 3—3 of Fig. 1, Fig. 4 is a sectional plan view taken on the line 4—4 of Fig. 2, Fig. 5 is a transverse section taken on the line 5—5 of Fig. 1, Fig. 6 is a top plan view showing two of the units of my invention placed upon a gas stove; the units being connected by coupling nipples, and Fig. 7 is a cross section taken on the line 7—7 of Fig. 1.

Referring to the drawings each of the units of my improved water heating top is made up of a hollow jacket or casing $7^a$ which may be cast from metal preferably of "white" metal or other material which will not readily rust. Orifices 8 extend entirely through the casing $7^a$ in the direction of its height; said orifices being located so as to be in line with the usual burners of a gas stove and so that the flame from the burners will pass upwardly through the orifices. As clearly shown in Figs. 3, 4 and 7 these orifices are formed by walls 9 which extend upwardly and are integral with the top 10 and bottom 11. Hollow extensions 12 are formed integral with the walls 9; said extensions having upper surfaces 13 below and substantially parallel with the upper surface of the top 10, and said upper surfaces 13 of the extensions 12 serve as a support for cooking utensils and at the same time permit the lids 14 to rest thereon so as to have their tops flush with the upper surface of the top 10.

A partition 15 extends between the side walls 9 of adjacent orifices and leads from the bottom 11 to the top 10, as clearly shown in Figs. 4 and 5. The partition 15 is also continued as shown at $15^a$ between the end 16 and the side wall of the adjacent orifice 8, and a water inlet pipe 17 is provided adjacent the end 16 on one side of the partition 15—$15^a$ and an outlet pipe 18 is provided adjacent the end 16 at a position opposite the partition 15—$15^a$ so that water entering through the pipe 17 will be compelled to pass from the end 16 at one side of the partition and around the side walls of the opposite orifice before it can pass outwardly through the pipe 18.

When two or more units are to be used, as shown in Fig. 6, the pipe 18 can be in the form of a coupling nipple $18^a$ for entering the side of another and similarly constructed unit; said nipple also entering through an opening in the jacket such for example as that through which the pipe 17 enters, and the water will be compelled to circulate around the entire jacket of said latter unit in the same manner as above specifically described in connection with the first mentioned unit.

Also by having the hollow extensions an extended heat absorbing area is provided; the water filling the extensions and thereby quickly absorbing heat from the flame passing up through the orifices.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A stove top consisting of a water jacket including top and bottom spaced apart and having continuous portions extending therebetween and providing burner holes spaced apart, said continuous portions having hollow extensions integral with said top and bottom and communicating directly with the water space between said top and bottom; a partition for said space extending between said continuous portions and between one of said portions and a side of said jacket, the opposite side of said jacket being spaced from the other of said portions to provide a water passage; a water inlet communicating with said space at one side of said partition; and a water outlet communicating with said space at the opposite side of said partition; substantially as described.

2. A stove top consisting of a water jacket including top and bottom spaced apart and having continuous portions extending therebetween and providing burner holes spaced apart, said continuous portions having hollow extensions integral with said top and bottom and communicating directly with the water space between said top and bottom; a partition for said space extending between said continuous portions and between one of said portions and a side of said jacket, the opposite side of said jacket being spaced from the other of said portions to provide a water passage; a water inlet communicating with said space at one side of said partition and adjacent said first side of the jacket; and a water outlet communicating with said space at the opposite side of said partition and adjacent said side of the jacket; substantially as described.

In testimony whereof I have signed my name to this specification in the presence of two subscribing witnesses.

HARRY YOUNG.

Witnesses:
 WINFIELD S. H. KNOPF,
 LILLIAN F. VOGEL.